(12) United States Patent
Chen et al.

(10) Patent No.: US 9,886,517 B2
(45) Date of Patent: Feb. 6, 2018

(54) RANKING PRODUCT INFORMATION

(75) Inventors: Chao Chen, Hangzhou (CN); Jinghua Feng, Hangzhou (CN)

(73) Assignee: Alibaba Group Holding Limited (KY)

( * ) Notice: Subject to any disclaimer, the term of this patent is extended or adjusted under 35 U.S.C. 154(b) by 678 days.

(21) Appl. No.: 13/310,731

(22) Filed: Dec. 3, 2011

(65) Prior Publication Data

US 2012/0143883 A1    Jun. 7, 2012

(30) Foreign Application Priority Data

Dec. 7, 2010    (CN) .......................... 2010 1 0590355

(51) Int. Cl.
*G06F 7/00*      (2006.01)
*G06F 17/30*     (2006.01)

(52) U.S. Cl.
CPC ................ *G06F 17/3089* (2013.01)

(58) Field of Classification Search
USPC ....................................................... 707/751
See application file for complete search history.

(56) References Cited

U.S. PATENT DOCUMENTS

| | | |
|---|---|---|
| 5,754,938 A | 5/1998 | Herz et al. |
| 5,754,939 A | 5/1998 | Herz et al. |
| 5,835,087 A | 11/1998 | Herz et al. |
| 5,926,822 A | 7/1999 | Garman |
| 6,029,195 A | 2/2000 | Herz |
| 6,195,657 B1 | 2/2001 | Rucker et al. |
| 6,236,990 B1 | 5/2001 | Geller |
| 6,606,624 B1 | 8/2003 | Goldberg |
| 7,089,237 B2 | 8/2006 | Turnbull et al. |
| 7,181,488 B2 | 2/2007 | Martin et al. |
| 7,320,020 B2 | 1/2008 | Chadwick et al. |
| 7,376,714 B1 | 5/2008 | Gerken |
| 7,412,202 B2 | 8/2008 | Gutta et al. |
| 7,606,772 B2 | 10/2009 | Flinn et al. |

(Continued)

FOREIGN PATENT DOCUMENTS

| | | |
|---|---|---|
| CN | 101079064 | 11/2007 |
| CN | 101334783 | 12/2008 |

(Continued)

OTHER PUBLICATIONS

Forsati et al., "Web Page Personalization Based on Weighted Association Rules", 2009 International Conference on Electronic Computer Technology, Feb. 20, 2009, pp. 130-135.

(Continued)

*Primary Examiner* — Tuan A Pham
*Assistant Examiner* — Muluemebet Gurmu
(74) *Attorney, Agent, or Firm* — Van Pelt, Yi & James LLP (57) ABSTRACT

Ranking product information is disclosed, including: determining, for each of a plurality of pieces of product information, a category grading value and a plurality of attribute grading values associated with that piece of product information; determining a plurality of user demand values corresponding to the plurality of pieces of product information based at least in part on the category grading value and at least one of the plurality of attribute grading values associated with each of the plurality of pieces of product information; and ranking the plurality of pieces of product information based at least in part on the corresponding plurality of user demand values.

20 Claims, 6 Drawing Sheets

(56) References Cited

U.S. PATENT DOCUMENTS

| | | |
|---|---|---|
| 7,676,400 B1 | 3/2010 | Dillon |
| 7,836,051 B1 | 11/2010 | Mason |
| 8,122,031 B1 | 2/2012 | Mauro et al. |
| 8,270,955 B2 | 9/2012 | Ramer et al. |
| 8,271,413 B2 | 9/2012 | Agarwal et al. |
| 8,271,878 B2 | 9/2012 | Kane et al. |
| 8,301,514 B1 | 10/2012 | Vippagunta |
| 8,645,409 B1 | 2/2014 | Garg et al. |
| 8,898,283 B2 | 11/2014 | Zhang et al. |
| 2001/0049623 A1 | 12/2001 | Aggarwal et al. |
| 2003/0005113 A1 | 1/2003 | Moore |
| 2003/0093338 A1* | 5/2003 | Kim ............... G06Q 30/02 705/26.7 |
| 2004/0044677 A1 | 3/2004 | Huper-Graff et al. |
| 2005/0096997 A1 | 5/2005 | Jain et al. |
| 2005/0222987 A1 | 10/2005 | Vadon |
| 2005/0289140 A1 | 12/2005 | Ford et al. |
| 2006/0041550 A1 | 2/2006 | Bennett et al. |
| 2006/0069616 A1 | 3/2006 | Bau |
| 2006/0111833 A1 | 5/2006 | Feldman et al. |
| 2006/0136589 A1 | 6/2006 | Konig et al. |
| 2006/0288038 A1 | 12/2006 | Zheng et al. |
| 2007/0061195 A1 | 3/2007 | Liu et al. |
| 2007/0100840 A1 | 5/2007 | Masubara |
| 2007/0203589 A1 | 8/2007 | Flinn et al. |
| 2007/0233730 A1 | 10/2007 | Johnston |
| 2007/0239535 A1 | 10/2007 | Koran et al. |
| 2008/0004884 A1 | 1/2008 | Flake et al. |
| 2008/0033939 A1 | 2/2008 | Khandelwal |
| 2008/0120129 A1* | 5/2008 | Seubert et al. ............ 705/1 |
| 2008/0162431 A1 | 7/2008 | Xu et al. |
| 2008/0201311 A1 | 8/2008 | Ertugrul et al. |
| 2008/0209351 A1 | 8/2008 | MacAdaan et al. |
| 2009/0006207 A1 | 1/2009 | Datar et al. |
| 2009/0037355 A1 | 2/2009 | Brave et al. |
| 2009/0063284 A1 | 3/2009 | Turpin et al. |
| 2009/0083362 A1 | 3/2009 | Svendsen |
| 2009/0106221 A1 | 4/2009 | Meyerzon et al. |
| 2009/0125719 A1 | 5/2009 | Cochran et al. |
| 2009/0240586 A1 | 9/2009 | Ramer et al. |
| 2009/0248494 A1 | 10/2009 | Hueter et al. |
| 2009/0271800 A1 | 10/2009 | Dashpande et al. |
| 2009/0281870 A1 | 11/2009 | Sun et al. |
| 2010/0076968 A1 | 3/2010 | Boyns et al. |
| 2010/0082503 A1* | 4/2010 | Kantak ............... G06Q 10/087 705/400 |
| 2010/0114587 A1 | 5/2010 | Masuyama et al. |
| 2010/0153440 A1 | 6/2010 | Hubert |
| 2010/0235351 A1 | 9/2010 | Iwasa et al. |
| 2010/0262692 A1 | 10/2010 | Zhang et al. |
| 2010/0293034 A1 | 11/2010 | Olejniczak et al. |
| 2010/0293160 A1 | 11/2010 | Aravamudan et al. |
| 2010/0332304 A1 | 12/2010 | Higgins et al. |
| 2011/0015992 A1* | 1/2011 | Liffiton ............... G06Q 30/02 705/14.46 |
| 2011/0035379 A1 | 2/2011 | Chen et al. |
| 2011/0264736 A1 | 10/2011 | Zuckerberg et al. |
| 2012/0047148 A1 | 2/2012 | Guo et al. |
| 2012/0095837 A1 | 4/2012 | Bharat et al. |
| 2012/0233173 A1 | 9/2012 | Yang et al. |
| 2012/0254099 A1 | 10/2012 | Flinn et al. |
| 2012/0265599 A1 | 10/2012 | Corner et al. |
| 2012/0278127 A1 | 11/2012 | Kirakosyan |
| 2012/0290434 A1 | 11/2012 | Moritz et al. |
| 2012/0290950 A1 | 11/2012 | Rapaport et al. |
| 2012/0330936 A1 | 12/2012 | McCloskey et al. |
| 2013/0055145 A1 | 2/2013 | Antony et al. |
| 2013/0166488 A1 | 6/2013 | Yang et al. |

FOREIGN PATENT DOCUMENTS

| | | |
|---|---|---|
| CN | 101694659 | 4/2010 |
| FR | 2878670 | 6/2006 |
| JP | 2001236405 | 8/2001 |
| JP | 2001265767 | 9/2001 |
| JP | 2002007873 | 1/2002 |
| JP | 2002063303 | 2/2002 |
| JP | 2002108918 | 4/2002 |
| JP | 2003058672 | 2/2003 |
| JP | 2003150835 | 5/2003 |
| JP | 2006012115 | 1/2006 |
| JP | 2007140841 | 6/2007 |
| JP | 2007318364 | 12/2007 |
| JP | 2008305037 | 12/2008 |
| JP | 2009508275 | 2/2009 |
| JP | 2010108082 | 5/2010 |
| WO | 2010011603 | 1/2010 |
| WO | 2011005072 | 1/2011 |
| WO | 2011076070 | 6/2011 |

OTHER PUBLICATIONS

Kim et al., "A preference scoring technique for personalized advertisements on Internet storefronts", Mathematical and Computer Modeling, vol. 44, No. 1-2, Jul. 1, 2006. pp. 3-15.

* cited by examiner

RANKING PRODUCT INFORMATION

CROSS REFERENCE TO OTHER APPLICATIONS

This application claims priority to People's Republic of China Patent Application No. 201010590355.2 entitled QUERY RESULT SORTING METHOD AND DEVICE filed Dec. 7, 2010 which is incorporated herein by reference for all purposes.

FIELD OF THE INVENTION

This application involves the field of Internet data processing. In particular, it involves a technique for ranking search results.

BACKGROUND OF THE INVENTION

Typically, search results returned in response to a query are ranked (e.g., to determine the sequence in which the search results appear on the screen) based on commercial factors such as how relevant the results are to the query results and/or the quality of the search results and/or the party associated with the search results. However, such conventional techniques do not always produce a ranking of results that the search users desire. For example, a search result that is determined by a search engine to be relevant and therefore appears earlier in the results may not necessarily be a search result that is actually desired by users.

Sometimes, the ranking of search results based on conventional methods may cause the click-through rates for the search results to be relatively low. A click-through rate of a search result (e.g., link) is determined as the total number of clicks on that link divided by the total number of times that link has been displayed (the total number of impressions for the link). A low click-through rate may be explained by the fact that because the ranking of the search results may not reflect the ranking desired by the search user, the user may be discouraged from clicking on the search results.

One particular drawback to conventional techniques is that they fail to differentiate between search results such as which search results are in higher user demand and which are in lower user demand. The search results with higher user demand typically receive more clicks and those with lower user demand typically receive fewer clicks. Because conventional techniques cannot distinguish between search results of higher and lower user demand, many search results with lower demand can be transmitted from the server to the client without appreciably increasing the overall quality of search results and in fact, unnecessarily increasing network traffic.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Ranking pieces of product information based on their respective determined user demand values is disclosed. In various embodiments, a user demand value associated with a piece of product information is used to indicate the predicted degree of desirability of that piece of product information by users. Such ranking enables for pieces of product information associated with higher user demand to be displayed earlier than those with lower user demand, which could spare the user who is searching for a particular piece of product information from navigating through volumes of undesired search results before coming across the desired pieces of product information among the displayed search results. By prioritizing the more desired search results, click-through rates associated with webpages of pieces of product information will also increase.

Figure 1:
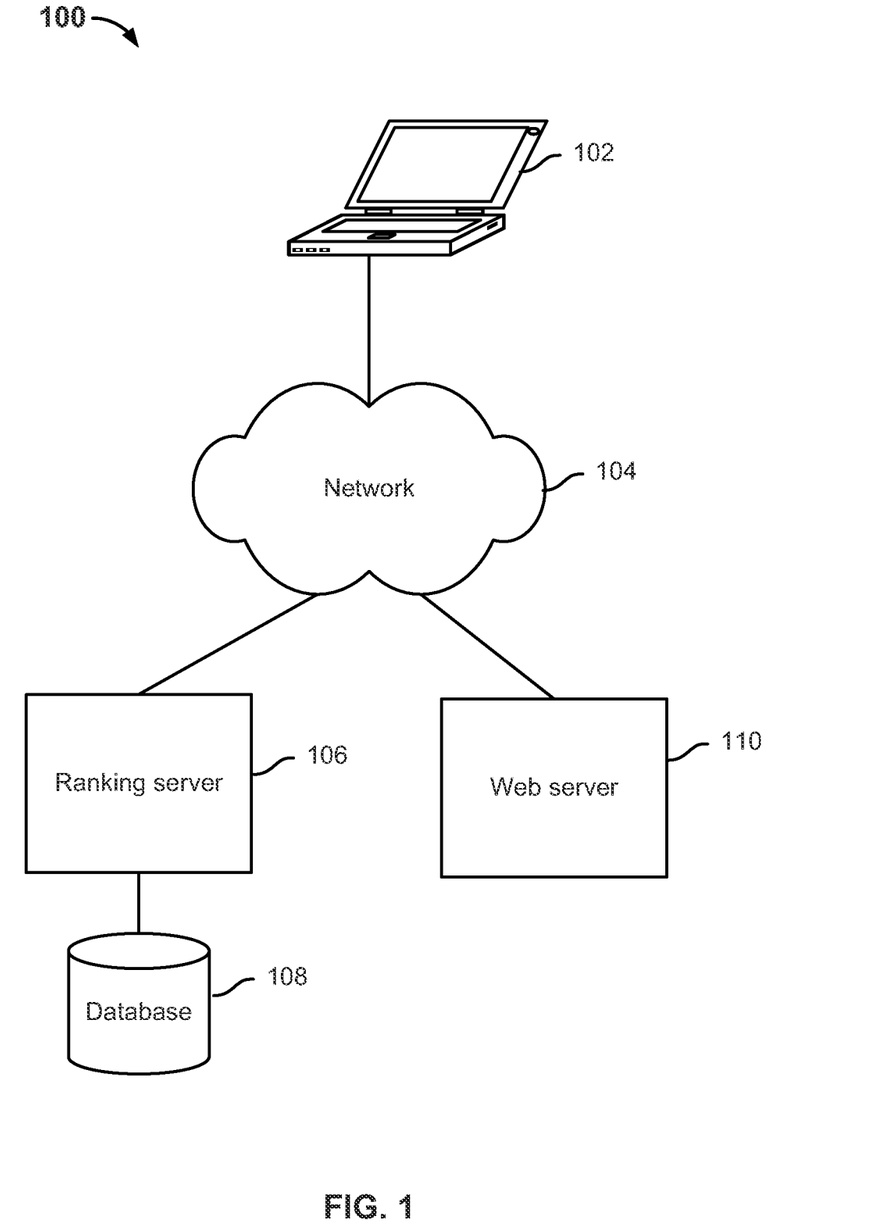
FIG. 1 is a diagram showing an embodiment of a system for determining user demand values.

FIG. 1 is a diagram showing an embodiment of a system for determining user demand values. System 100 includes device 102, network 104, ranking server 106, database 108, and web server 110. In some embodiments, network 104 is implemented using high-speed data networks and/or telecommunications networks. In some embodiments, ranking server 106 and web server 110 are configured to work separately but coordinate with each other and in some embodiments, ranking server 106 and web server 110 are configured to work in combination.

Examples of device 102 include a laptop computer, a desktop computer, a smart phone, a mobile device, a tablet device or any other computing device. Device 102 is configured to communicate with ranking server 106. In various embodiments, an application such as a web-browser is installed at device 102 to enable communication with ranking server 106. For example, a user at device 102 can access a website associated with/hosted by web server 110 by entering a certain uniform resource locator (URL) at the web browser address bar. For example, web server 110 can be associated with an electronic commerce website. A user (e.g., a potential buyer) can send a search query to ranking server 106 (directly or via web server 110) to receive a list of search results comprising pieces of product information (information regarding products that are sold at the website) that can be browsed over one or more pages. As will be discussed below, the returned search results are ranked based on their respective user demand values that are determined by ranking server 106. Device 102 can also display the pieces of product information returned for the search query.

The user demand value associated with a piece of product information is used to indicate the predicted degree of desirability of that piece of product information by users. In various embodiments, the user demand value of a piece of product information is determined by ranking server 106 using historical search data (e.g., the number of impressions of the piece of product information, the number of clicks on the displayed piece of product information, a traffic hit value associated with a webpage associated with the piece of product information) stored at database 108. In various embodiments, a user demand value associated with a piece of product information is determined by ranking server 106 based at least in part on category grading information and attribute grading information determined for that piece of product information from historical search data.

In various embodiments, pieces of product information returned as search results for a search query can be ranked based on their corresponding user demand values. For example, the pieces of product information associated with higher user demand values are displayed earlier among the search results and those with lower user demand values are displayed later among the search results. Since search results are generally displayed on one or more webpages (depending on the quantity of search results), the pieces of product information that are displayed earlier (e.g., displayed on one of the first webpages of the search results) are assumed to be more desirable to users and will therefore be easier for the searching user to locate among all search results.

Figure 2:
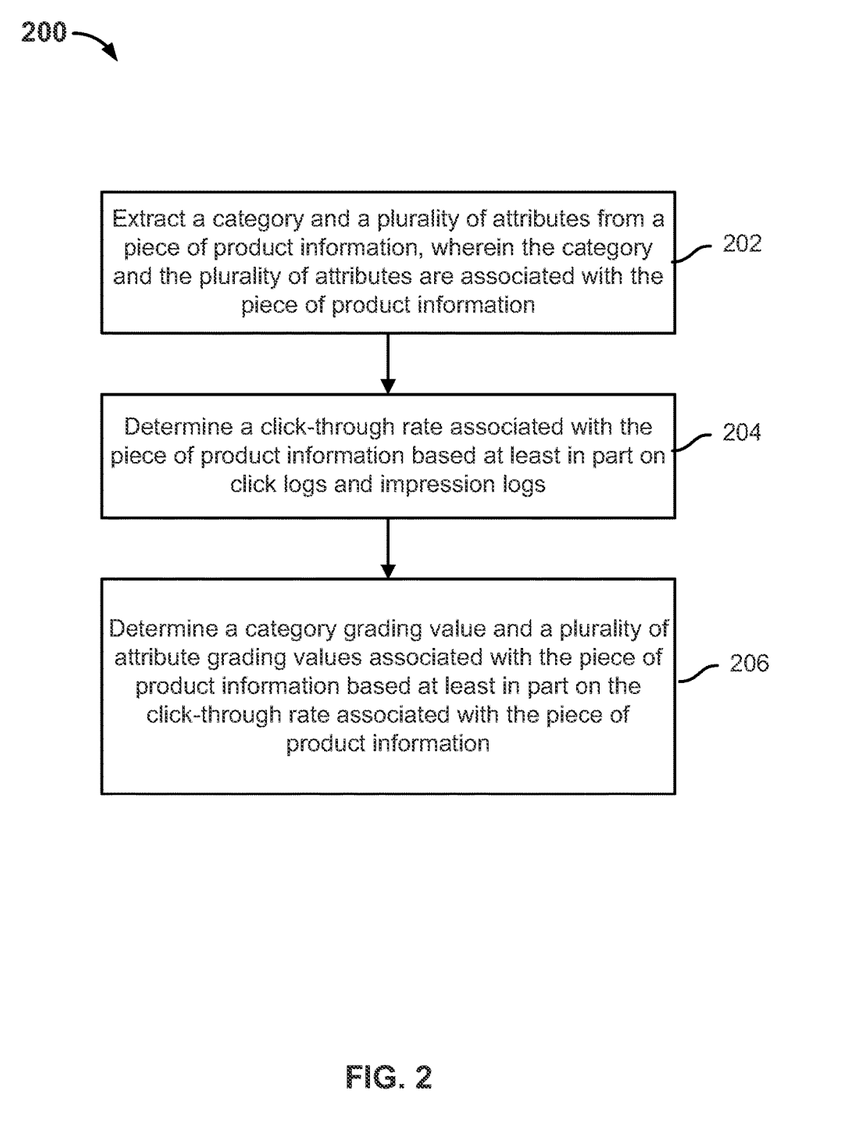
FIG. 2 is a flow diagram showing an embodiment of a process of determining category grading information and attribute grading information associated with product information.

FIG. 2 is a flow diagram showing an embodiment of a process of determining category grading information and attribute grading information associated with product information.

In various embodiments, category grading information and attribute grading information associated with product information can be determined prior to assigning user demand values to the product information. The determined category grading information and attribute grading information can be stored (e.g., at a database) and accessed when subsequently determining the user demand values that correspond to the product information. Determining the category grading information and attribute grading information prior to determining user demand values may be more efficient than determining user demand values and the grading information concurrently because, as will be explained below, the determination of user demand values is based at least in part on the grading information.

In various embodiments, a piece of product information can include a set of information regarding one or more products. For example, if there is more than one product included in a set of information, then the products can be related by one or more common traits. For example, pieces of product information can be used for an electronic commerce website and can represent the array of available products for sale at the website. In response to a user submitted query for products at the electronic commerce website, pieces of product information that match the query can be returned as search results for the searching user. Each piece of product information included in the search results can be a link (e.g., a Uniform Resource Locator) that the user can click on to be taken to a webpage dedicated to the one or more products associated with that piece of product information.

Categories can be used to describe classifications of product information. In various embodiments, each piece of product information is associated with the characteristics of at least one category and at least one attribute. For example, product information associated with mobile phones can be associated with the category of mobile phones. Examples of attributes associated with the category of mobile phones can include brand, standard, and screen size. In addition to at least one category and at least one attribute, each piece of product information, in some embodiments, can also be associated with product keywords, product price, product brand, and product model, for example. In various embodiments, separate grading information is determined for the category of a piece of product information and the attribute(s) of that piece of product information.

In various embodiments, grading information is determined for only the corresponding characteristics of category and attribute(s) of a piece of product information because every piece of product information includes these two characteristics and as such, category and attribute characteristics can help describe each piece of product information.

At 202, a category and a plurality of attributes are extracted from a piece of product information, wherein the category and the plurality of attributes are associated with the piece of product information. In various embodiments, a category and a plurality of attributes associated with a piece of product information is determined for each of many stored pieces of product information. For example, the stored pieces of product information can represent (at least in part) products for sale at an electronic commerce website.

At 204, a click-through rate associated with the piece of product information is determined based at least in part on click logs and impression logs.

Stored logs associated with the pieces of product information used (e.g., in search results) in historical search queries may comprise click logs and impression logs. For example, the historical queries from a predetermined length of time in the past may be considered for determining click and impression logs. In some embodiments, impression logs are used to record the number of times each piece of product information is displayed to users (e.g., as a part of search results returned for past searches). The number of times that each piece of product information is displayed to users is also referred to as the number of impressions associated with that piece of product information. In some embodiments, click logs are used to record the number of times each piece of product information that has been displayed to users has been clicked.

In various embodiments, using the impression logs and click logs, a click-through rate is determined for each stored piece of product information. In various embodiments, click-through rates of each piece of product information can be determined using known methods. For example, to determine the click-through rate for each piece of product information, the number of impressions associated with the piece of product information is accessed from the impression logs and the total number of clicks associated with the piece of product information is accessed from click logs. Then the click-through rate associated with that piece of product information is determined as the quotient of the total number of clicks divided by the total number of impressions. Click-through rates are generally used to measure the quality of ranking results.

In some embodiments, prior to determining the click-through rate for the piece of product information, filtering can be done to certain data contained in the click logs and the impression logs. For example, in response to a particular search in the past, if all product information that is displayed is clicked, then the search does not provide useful information because it does not help determine which pieces of product information are in higher demand than others since all the pieces of displayed product information seem to be in equal demand by virtue of being clicked on. As such, click and impression data associated with this search will not be recorded in the click/impression logs and if such data were recorded, then they will not be used in determining the click-through rate of the pieces of product information. In another example, a threshold value can be set for the number of times a product information displayed in response to a search is clicked on to determine whether or not the click and impression data associated with that search is useful for determining user demand. When the number of times that a displayed piece of product information is clicked on exceeds the threshold value, then clicks in excess of the threshold value are not considered in determining the click-through rate of that piece of product information. In the embodiments, 202 and 204 may be implemented one after the other by implementing either 202 or 204 first before the other. In some embodiments, 202 and 204 can be implemented concurrently at least in part.

At 206, a category grading value and a plurality of attribute grading values associated with the piece of product information are determined based at least in part on the click-through rate associated with the piece of product information.

Because each piece of product information can be described by its corresponding category and attributes, the click-through rate of the piece of product information can be used as the click-through rate of the category and also of the attributes associated with the piece of product information. For example, the category of a certain piece of product information is M, and the associated attributes are N1, N2, . . . , Nn. If a user clicks on this piece of product information in the course of reviewing search results for a given search query, then category M and attributes N1, N2, . . . , Nn corresponding to the piece of product information are all considered to have received that click and if the user does not click this piece of product information, then its associated category and attributes are also considered to have not received a click.

As such, the category and attributes associated with a piece of product information becomes associated with the same click-through rate that is determined for that piece of product information. Then, the click-through rate associated with the category and the click-through rate associated with each of the attributes are used to determine their respective grading value. In some embodiments, the grading value associated with the category is determined based at least in part on its associated click-through rate and/or associated website traffic rate. In some embodiments, the grading values associated with the attributes are determined based at least in part on their associated click-through rates and/or website traffic rates.

In some embodiments, the grading value corresponding to each specific category is predetermined and stored in a table that includes the mappings between grading values and categories of pieces of product information. An example of such a table is shown below in Table 1.

TABLE 1

Mappings between grading values and categories of pieces of product information

| Category grading value | Specific categories corresponding to each grading value |
|---|---|
| Grade 1 | category A1, category A2, category A3, . . . |
| Grade 2 | category B1, category B2, category B3, . . . |
| Grade 3 | category C1, category C2, category C3, . . . |

In some embodiments, the grading value of a category (or an attribute) can be assigned a weight value (e.g., by a system administrator). In Table 1, grade 1 is associated with the highest weight value (of the available grades shown in Table 1), grade 2 is associated with the next highest weight value, and grade 3 is associated with the lowest weight value. Other associations can be made in other embodiments.

In some embodiments, another table can be used to store the criteria associated with a piece of product information that are used to determine the respective grading value for its associated category. An example of such a table is shown below in Table 2.

In the example of Table 2, the terms are defined as follows: a high PV category refers to a category for which its website traffic hits within an established period of time exceeds a first threshold value. The first threshold value may be set at a percentage (e.g., 10%) of the threshold value of the total sum of the traffic hits to websites corresponding to categories corresponding to all pieces of product information (e.g., that are relevant to the query words of a current search query), or it may be set as a fixed number of visits, for example, 100 visits or 200 visits. The established time period may be two weeks, or it may be another period of time, which can be determined based on actual data processing circumstances. A low PV category refers to a category for which its website traffic hits within an established period of time is below a second threshold value. The second threshold value may be set as a percentage (e.g., 1%) of the total sum of the traffic hits to websites corresponding to the categories corresponding to pieces of product information, or it may be set as a fixed number of visits, for example, 5 visits. A medium PV category refers to a category for which its website traffic value falls between the first threshold value and the second threshold value within an established period of time, i.e., one that is neither a high PV category nor a low PV category. In some embodiments, the average category (or attribute as used in Table 4) click-through rate is the average of the click-through rates associated with all categories (or attributes) associated with the pieces of product information that are to be returned as search results in response to a current user submitted search query. As will be explained below in process 300, a search query comprising one or more query words is submitted by a user and in response to the search query, pieces of product information that match/are relevant to the query words are determined and the click-through rates associated with the categories of these pieces of product information can be used to determine the average click-through rate for a table such as Table 2.

TABLE 2

Criteria for each category grading value

| Category grading value | Criteria associated with a piece of product information that are used to determine the respective category grading value |
|---|---|
| Grade 1 | High page view (PV) categories or medium PV categories, e.g., the category click-through rate of the category is greater than the average category click-through rate |
| Grade 2 | High PV categories, e.g., the click-through rate of the category is greater than 75% of the average category click-through rate; or medium PV categories, e.g., the click-through rate of the category is greater than 90% of the average category click-through rate |
| Grade 3 | Low PV categories, e.g., categories that are not of Grade 1 or Grade 2 |

In some embodiments, the grading value corresponding to each specific attribute is predetermined in a stored table that includes the mappings between grading values and attributes of pieces of product information. An example of such a table is shown below in Table 3.

TABLE 3

Mappings between grading values and attributes of pieces of product information

| Attribute grading values | Specific attributes corresponding to each grading value |
|---|---|
| Grade 1 | attribute D1, attribute D2, attribute D3, . . . |
| Grade 0 | attribute E1, attribute E2, attribute E3, . . . |

In Table 3, while only two grading values (grade 1 and grade 0) are shown, there could be more than two possible grading values corresponding to the attributes. In Table 3, grade 1 is associated with the highest weight value and grade 0 is associated with the next highest weight value, and so forth.

In some embodiments, another table can be used to store the criteria associated with a piece of product information that are used to determine the respective grading value for its associated category. An example of such a table is shown below in Table 4.

TABLE 4

Criteria for each attribute grading value

| Attribute grading values | Criteria associated with a piece of product information that are used to determine the respective attribute grading values |
|---|---|
| Grade 1 | Click-through rates of attributes are greater than the average attribute click-through rate |
| Grade 0 | Click-through rates of attributes are less than the average attribute click-through rates |

For example, seven pieces of product information (product information M, product information N, product information O, product information P, product information Q, product information R, and product information S) all include the same attribute D1 and only one piece of product information (product information Z) includes attribute D2. Because the click-through rates associated with all of product information M, product information N, product information O, product information P, product information Q, product information R, and product information S are collectively greater than the click-through rate of product information Z, then attribute D1 is also associated with a higher click-through rate than attribute D2 and thus, likely, a higher attribute grading value than attribute D2.

Table 1, Table 2, Table 3, and Table 4 are only examples. Other changes can be made to the above examples to determine the grading values associated with the category and/or attributes of a piece of product information. For example, in the criteria associated with a piece of product information that are used to determine the respective category grading value, in some embodiments, either the average category click-through rate alone or the website traffic hits associated with each category alone, or a combination of the two may be used as the criterion for determining the grading value of each category. Or, for example, in some embodiments, other data capable of achieving the same effect as that of the average category click-through rate may also be used as criteria for determining the grade in addition or alternatively to the average category click-through rate. Or, for example, in some embodiments, when the average category click-through rate is used as a criterion for determining the category grading value, other percentage thresholds may also be used, and such use is not limited to the 100%, 75% and 90% thresholds that are shown in Table 2. In the criteria associated with a piece of product information that are used to determine the respective attribute grading values, either the average attribute click-through rate alone or the website traffic hits associated with each attribute alone or a combination of the two may be used as the criterion for determining the grading value of each attribute.

Figure 3:
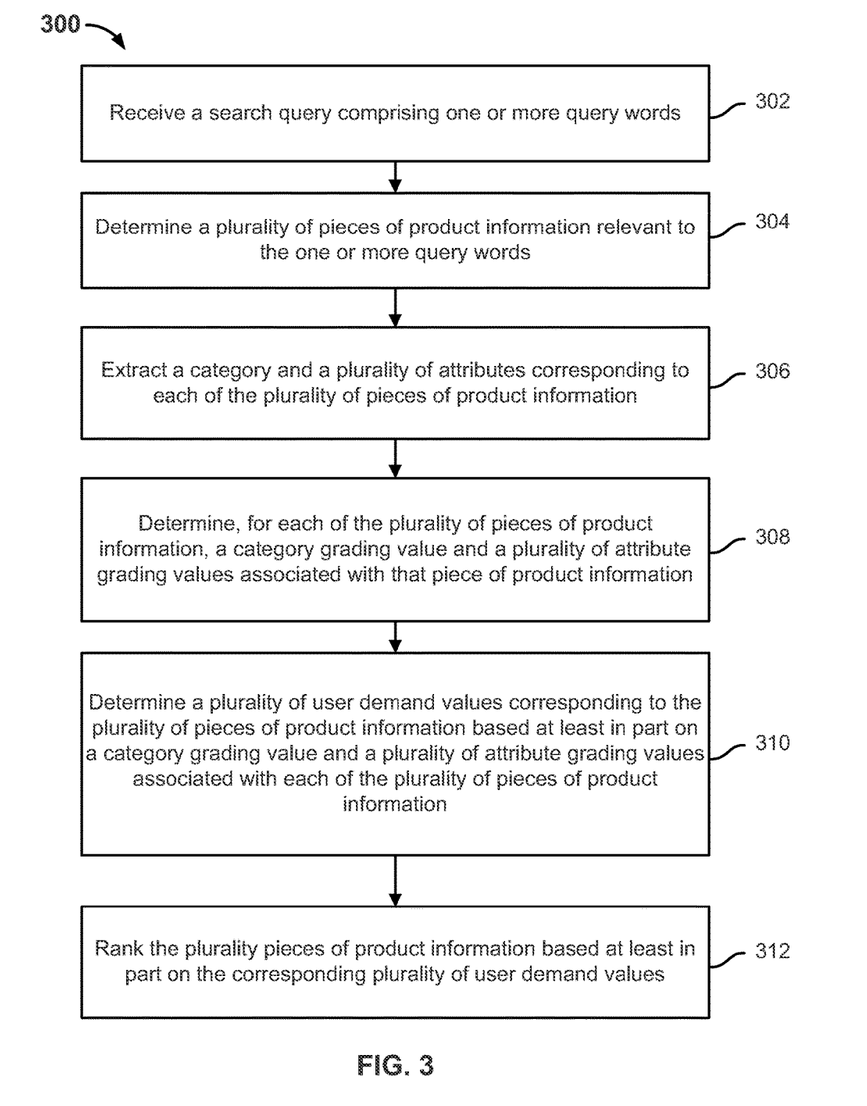
FIG. 3 is a flow diagram showing an embodiment of a process for ranking pieces of product information in search results based on user demand values associated with the product information.

FIG. 3 is a flow diagram showing an embodiment of a process for ranking pieces of product information in search results based on user demand values associated with the product information.

At 302, a search query comprising one or more query words is received. In some embodiments, the search query is submitted by a user at a website looking for content that is relevant to that website. A search query can include one or more queries or keywords. For example, if the website were an electronic commerce website, then a user can submit a search query at the website to search for products that are available for sale at the website. In response to the search query, the electronic commerce website can return search results that include one or more pieces of product information that match/are relevant to the query words of the search query.

At 304, a plurality of pieces of product information relevant to the one or more query words is determined. In some embodiments, a database that stores the pieces of product information associated with the website is searched for those pieces of product information that match/are relevant to the query words. For example, each piece of product information can be stored in a data structure where each characteristic (e.g., category, attribute) can be stored therein as a different variable. The values of the attributes of each piece of product information can be checked against the query words to determine which pieces of product information have variable values that match the query words. These matching pieces of product information are to be displayed as part of the search results for the search query. However, the pieces of product information are ranked, as explained below, prior to their being displayed.

At 306, a category and a plurality of attributes corresponding to each of the plurality of pieces of product information are extracted. In some embodiments, the category and attributes associated with a piece of product information are extracted from each of the pieces of product information (or the data structures thereof) that are determined to match/be relevant to the query words of the search query in 304. In some embodiments, more than one category can be extracted for each piece of product information.

At 308, a category grading value and a plurality of attribute grading values associated with a piece of product information are determined for each of the plurality of pieces of product information.

In some embodiments, a category and attributes associated with each piece of product information (e.g., associated with the electronic commerce website) have already been determined prior to process 300 and are stored (e.g., in a database). In some embodiments, the category and attribute information associated with each piece of product information has been determined using a process such as process 200. For example, a table like Table 1 can be searched to determine the grading value of a category associated with a piece of product information. Also, for example, a table like Table 3 can be searched to determine the grading value of each attribute associated with the piece of product information and to determine the number of attributes having the highest grading values.

In some embodiments, it is further determined for each piece of product information, which of the one or more associated attributes are associated with the highest grading values relative to the other attributes associated with the same piece of product information. For example, assume that piece of product information X is associated with Attribute A, Attribute B, and Attribute C. In this example, Attribute A is associated with grading value 1, Attribute B is associated with grading value 1, and Attribute C is associated with grading value 0. Assume that grading value 1 is the highest grading value and so Attribute A and Attribute B are both associated with the highest grading value of 1. Thus, there are two attributes associated with the highest grading value for piece of product information X.

At 310, a plurality of user demand values corresponding to the plurality of pieces of product information is determined based at least in part on a category grading value and a plurality of attribute grading values associated with each of the plurality of pieces of product information.

In some embodiments, the category grading value and the attribute grading values associated with each of the pieces of product information that are found to match/be relevant to the search query are used to determine the user demand value associated with that piece of product information.

In some embodiments, the user demand value associated with a piece of product information found in response to the search query is determined based at least in part on the category grading value and the attribute grading values associated with the piece of product information. Once the user demand values of all the pieces of product information found in response to the search query are determined, these pieces of product information can be ranked and displayed among the search results based on their corresponding user demand values. For example, a piece of product information that corresponds to a higher user demand value will be ranked higher among the list of search results and also displayed earlier than a piece of product information that corresponds to a relatively lower user demand value.

For example, a user demand value associated with a piece of product information can be determined using formula (1) below:

$$V = W^* \alpha / C1 + W^* \beta^* N1 / Nw \quad (1)$$

In this formula, V represents the user demand value, W represents the user preference weighting (e.g., that can be a value assigned by a system administrator or by default), C1 represents the category grading value associated with the piece of product information, N1 represents the number of attributes associated with the piece of product information that are associated with the highest grading value, Nw represents the total number of attributes that are associated with the piece of product information, $\alpha$ and $\beta$ can be values set between 1 and 0, and the sum of $\alpha$ and $\beta$ can equal 1. For example, the value of $\alpha$ can be 0.8, and the value of $\beta$ can be 0.2. However, the values of $\alpha$ and $\beta$ can be determined based on actual circumstances, and are not limited to the examples given. In some embodiments, user demand values for each piece of product information can be obtained based on formula (1), and then the various pieces of product information can be ranked based on the user demand values.

In some other embodiments, user demand values can also be determined using machine learning methods such as statistical regression. For example, a machine learning method can be used by first manually sample-tagging each piece of product information and determining the degree of demand of each piece of product information based on logged information. Then the category grading value and attribute grading values of each piece of product information included in the samples would be determined and used as the basis for training a model used to determine user demand values. Then, in response to a search query received (e.g., at 302), the user demand values for the pieces of product information that match the query words of the search query can be predicted based on the category grading value and attribute grading values generated by the trained model for the pieces of product information.

At 312, the plurality of pieces of product information is ranked based at least in part on the corresponding plurality of user demand values.

In some embodiments, a ranked list of pieces of product information is generated, where, for example, the piece of product information associated with the highest user demand value is ranked first and the piece of product information associated with the second highest user demand value is ranked second, and so forth. In some embodiments, the search results displayed for the search query submitted at 302 feature the pieces of product information ordered in a sequence based on the ranked list. For example, the pieces of product information that are associated with higher user demand values are displayed relatively early (e.g., among the first few webpages of search results) while the pieces of product information that that are associated with lower user demand values are displayed relatively later (e.g., among the last few webpages of the search results). By displaying the pieces of product information that are associated with higher user demand values (information that is predicted to be more interesting/desirable/demanded by users) earlier, the searching user can find the desirable piece of product information that matches his/her search query more quickly.

In some embodiments, those piece(s) of product information that are associated with user demand values that are lower than a set threshold value are discarded. This is because pieces of product information that are associated with user demand values lower than the set threshold are considered to be not desirable to users.

In some embodiments, a process of determining grading values for the pieces of product information can be performed based at least in part on known techniques of text correlation and/or market mechanism models. Then, the ranking of each piece of product information within its associated grading value can be adjusted based on its user demand value relative to the user demand values of other pieces of product information of the same grading value. In some embodiments, the grading values for the pieces of product information can be performed prior to determining the user demand values.

Process 200 and/or 300 can be implemented using C++ and can be implemented on a Linux-based system.

Figure 4:
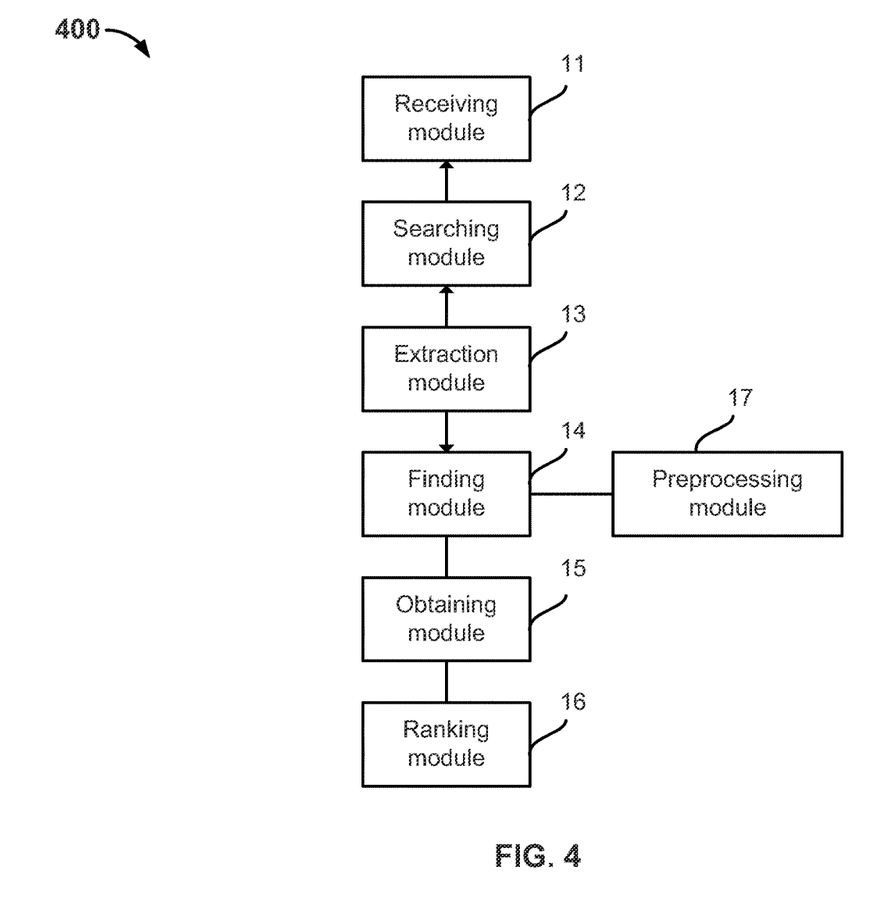
FIG. 4 is a diagram showing an embodiment of a system for ranking pieces of product information based on user demand values.

FIG. 4 is a diagram showing an embodiment of a system for ranking pieces of product information based on user demand values. In the example, system 400 includes: receiving module 11, searching module 12, extraction module 13, finding module 14, obtaining module 15, and ranking module 16.

The elements and modules can be implemented as software components executing on one or more processors, as hardware such as programmable logic devices and/or Application Specific Integrated Circuits designed to perform certain functions, or a combination thereof. In some embodiments, the elements and modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The elements and modules may be implemented on a single device or distributed across multiple devices.

Receiving module 11 is configured to receive a search query comprising one or more query words submitted by a user. Searching module 12 is coupled to receiving module 11, and is configured to search for pieces of product information that match/are relevant to the query words received by receiving module 11. Extraction module 13 is coupled to searching module 12 and is configured to extract the categories and attributes of each piece of product information that is found by searching module 12 to match/be relevant to the query words. Finding module 14 is coupled to extraction module 13 and is configured to determine the number of attributes associated with the highest grading value and grading value of the category extracted by extraction module 13 from the category and attribute information associated with each piece of product information. Obtaining module 15 is coupled to finding module 14 and is configured to determine user demand values for the pieces of product information that match/are relevant to the query words, based on the number of attributes associated with the highest grading value and grading value of the category associated with the pieces of product information found by finding module 14. Ranking module 16 is coupled to obtaining module 15 and is configured to rank the product information based on the user demand values determined by obtaining module 15.

In some embodiments, system 400 may also comprise preprocessing module 17. Preprocessing module 17 can be coupled to finding module 14 and is configured to determine category grading information and attribute grading information associated with pieces of product information based on historical search data. In some embodiments, the category grading information and attribute grading information determined by preprocessing module 17 can be provided to finding module 14.

Figure 5:
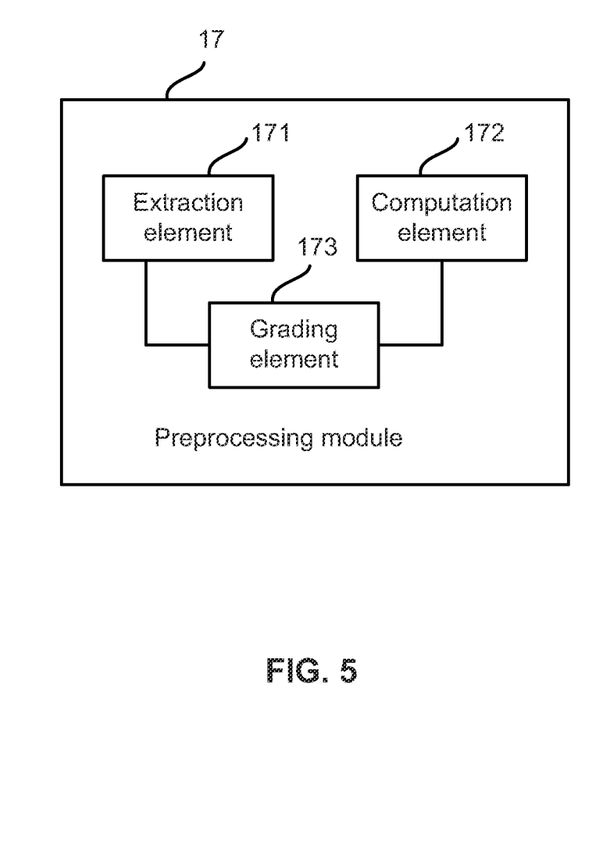
FIG. 5 is a diagram showing an example of a preprocessing module.

FIG. 5 is a diagram showing an example of a preprocessing module. In some embodiments, the example of FIG. 5 can be used to implement preprocessing module 17 of system 400. In the example, the preprocessing module includes: extraction element 171, computation element 172, and grading element 173. Extraction element 171 is configured to extract the categories and attributes of the stored pieces of product information associated with an electronic commerce website. Computation element 172 is configured to determine the click-through rates for each stored piece of product information based on the click logs and impression logs associated with historical search data at the electronic commerce website. Grading element 173 is coupled to extraction element 171 and computation element 172 and is configured to perform assigning grading values to categories and attributes associated with pieces of product information based on the various criteria. For example, the grading value for a category and/or an attribute can be determined based on a click-through rate and/or website traffic rate associated with its corresponding piece of product information.

Figure 6:
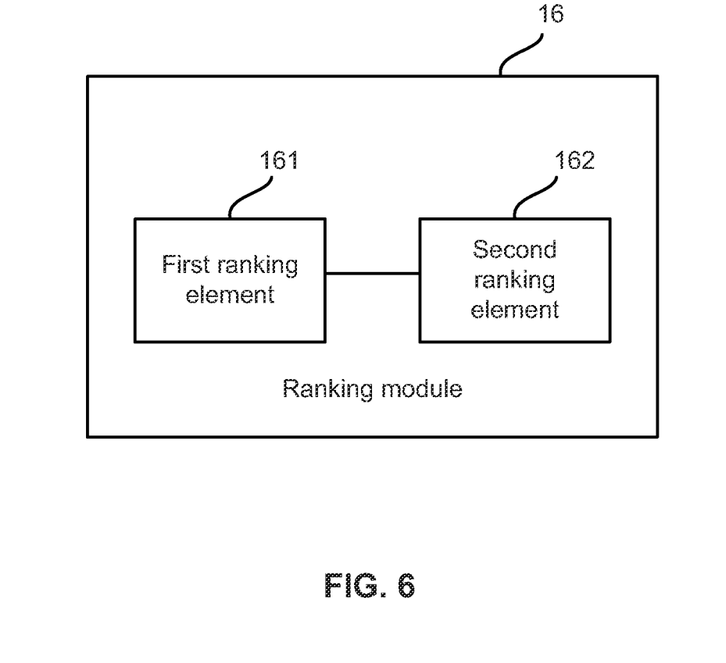
FIG. 6 is a diagram showing an example of a ranking module.

FIG. 6 is a diagram showing an example of a ranking module. In some embodiments, the example of FIG. 6 can be used to implement ranking module 16 of system 400. In the example, the ranking module comprises first ranking element 161 and second ranking element 162. First ranking element 161 is configured to assign grading values for categories and attributes of pieces of product information that match/are relevant to the query words of the search query. In some embodiments, second ranking element 162 is coupled to first ranking element 161 and is configured to adjust the ranking of a piece of product information associated with a certain grading value based on the user demand value of that piece of product information and of one or more other pieces of product information associated with that same grading value. In some embodiments, second ranking element 162 is also coupled to obtaining module 15. In some embodiments, when adjusting the ranking of the pieces of product information in association with each grading value based on the determined user values, second ranking element 162 can be further configured to filter out (e.g., discard) pieces of product information that are associated with user demand values lower than a predetermined threshold value. Pieces of product information with lower user demand values are assumed to be of less interest to users and so discarding such information would save resources that would otherwise be spent transmitting data between the server and client.

Although the present disclosure has already been described with reference to typical embodiments, it should be understood that the terms used are explanatory and exemplary, and are not restrictive terms. Because the present disclosure can be specifically implemented in a variety of forms without departing from the spirit or substance of the invention, it should be understood that the aforesaid embodiments are not limited to any of the details above, but should be broadly interpreted within the spirit and scope defined in the attached claims. Therefore all modifications and revisions falling within scope of the claims or their equivalent should be covered by the attached claims.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A method for ranking product information, comprising:
obtaining a category and a plurality of attributes corresponding to a piece of product information of a plurality of pieces of product information;
determining a category grading value associated with the category corresponding to the piece of product information and a plurality of attribute grading values corresponding to respective ones of the plurality of attributes corresponding to the piece of product information, wherein the category grading value and the plurality of attribute grading values associated with the piece of product information are obtained from storage, wherein the category grading value and the plurality of attribute grading values associated with the piece of product information are determined based at least in part on historical search data, and wherein the historical search data comprises one or more of click logs and impression logs;
determining, using a processor, a plurality of user demand values corresponding to the plurality of pieces of product information based at least in part on the category grading value and at least one of the plurality of attribute grading values associated with each of the plurality of pieces of product information, wherein the user demand values are based at least in part on an impression log that records a number of times a piece of product information is displayed and on a click log that records a number of times a piece of product information that has been displayed has been clicked, wherein determining the plurality of user demand values includes determining a user demand value corresponding to the piece of product information, wherein determining the user demand value corresponding to the piece of product information includes:
determining at least a subset of the plurality of attributes that meet a condition based at least in part on a respective plurality of attribute grading values, wherein the condition is associated with a selected attribute grading value from the plurality of attribute grading values; and
determining the user demand value corresponding to the piece of product information based at least in part on the category grading value, the determined at least the subset of the plurality of attributes, a weighting associated with category, and a weighting associated with the at least the subset of the plurality of attributes; and
ranking the plurality of pieces of product information based at least in part on the corresponding plurality of user demand values.

2. The method of claim 1, further comprising receiving a search query comprising one or more query words.

3. The method of claim 2, wherein the plurality of pieces of product information is determined as results in response to the one or more query words.

4. The method of claim 1, further comprising displaying the ranked plurality of pieces of product information, wherein the plurality of pieces of product information is displayed starting with one of the plurality of pieces of product information associated with a highest user demand value.

5. The method of claim 1 wherein the historical search data comprises click-through rates corresponding to pieces of product information.

6. The method of claim 1, wherein the condition comprises being associated with a highest attribute grading value and wherein the user demand value corresponding to the piece of product information is determined based at least in part on a function of the category grading value corresponding to the piece of product information, a number of attributes associated with the determined at least the subset of the plurality of attributes that meet the condition, and a total number of attributes associated with the plurality of attributes.

7. A system for ranking product information, comprising:
a processor configured to:
obtain a category and a plurality of attributes corresponding to a piece of product information of a plurality of pieces of product information;
determine a category grading value associated with the category corresponding to the piece of product information and a plurality of attribute grading values corresponding to respective ones of the plurality of attributes corresponding to the piece of product information, wherein the category grading value and the plurality of attribute grading values associated with the piece of product information are obtained from storage, wherein the category grading value and the plurality of attribute grading values associated with the piece of product information are determined based at least in part on historical search data, and wherein the historical search data comprises one or more of click logs and impression logs;
determine a plurality of user demand values corresponding to the plurality of pieces of product information based at least in part on the category grading value and at least one of the plurality of attribute grading values associated with each of the plurality of pieces of product information, wherein determining the plurality of user demand values includes determining a user demand value corresponding to the piece of product information, wherein the user demand values are based at least in part on an impression log that records a number of times a piece of product information is displayed and on a click log that records a number of times a piece of product information that has been displayed has been clicked, wherein determining the user demand value corresponding to the piece of product information includes:
determining at least a subset of the plurality of attributes that meet a condition based at least in part on a respective plurality of attribute grading values, wherein the condition is associated with a selected attribute grading value from the plurality of attribute grading values; and
determining the user demand value corresponding to the piece of product information based at least in part on the category grading value, the determined at least the subset of the plurality of attributes, a weighting associated with category, and a weighting associated with the at least the subset of the plurality of attributes; and
rank the plurality of pieces of product information based at least in part on the corresponding plurality of user demand values; and
a memory coupled to the processor and configured to provide the processor with instructions.

8. The system of claim 7, wherein the processor is further configured to receive a search query comprising one or more query words.

9. The system of claim 8, wherein the plurality of pieces of product information is determined as results in response to the one or more query words.

10. The system of claim 7, wherein the processor is further configured to display the ranked plurality of pieces of product information, wherein the plurality of pieces of product information is displayed starting with one of the plurality of pieces of product information associated with a highest user demand value.

11. The system of claim 7, wherein the historical search data comprises click-through rates corresponding to pieces of product information.

12. A computer program product for ranking product information, the computer program product being embodied in a non-transitory computer readable storage medium and comprising computer instructions for:
   obtaining a category and a plurality of attributes corresponding to a piece of product information of a plurality of pieces of product information;
   determining a category grading value associated with the category corresponding to the piece of product information and a plurality of attribute grading values corresponding to respective ones of the plurality of attributes corresponding to the piece of product information, wherein the category grading value and the plurality of attribute grading values associated with the piece of product information are obtained from storage, wherein the category grading value and the plurality of attribute grading values associated with the piece of product information are determined based at least in part on historical search data, and wherein the historical search data comprises one or more of click logs and impression logs;
   determining a plurality of user demand values corresponding to the plurality of pieces of product information based at least in part on the category grading value and at least one of the plurality of attribute grading values associated with each of the plurality of pieces of product information, wherein determining the plurality of user demand values includes determining a user demand value corresponding to the piece of product information, wherein the user demand values are based at least in part on an impression log that records a number of times a piece of product information is displayed and on a click log that records a number of times a piece of product information that has been displayed has been clicked, wherein determining the user demand value corresponding to the piece of product information includes:
      determining at least a subset of the plurality of attributes that meet a condition based at least in part on a respective plurality of attribute grading values, wherein the condition is associated with a selected attribute grading value from the plurality of attribute grading values; and
      determining the user demand value corresponding to the piece of product information based at least in part on the category grading value, the determined at least the subset of the plurality of attributes, a weighting associated with category, and a weighting associated with the at least the subset of the plurality of attributes; and
   ranking the plurality of pieces of product information based at least in part on the corresponding plurality of user demand values.

13. A computer program product for ranking product information, the computer program product being embodied in a non-transitory computer readable storage medium and comprising computer instructions for:
   obtaining a category and a plurality of attributes corresponding to a piece of product information of a plurality of pieces of product information;
   determining a category grading value associated with the category corresponding to the piece of product information and a plurality of attribute grading values corresponding to respective ones of the plurality of attributes corresponding to the piece of product information, wherein the category grading value and the plurality of attribute grading values associated with the piece of product information are obtained from storage, wherein the category grading value and the plurality of attribute grading values associated with the piece of product information are determined based at least in part on historical search data, and wherein the historical search data comprises one or more of click logs and impression logs;
   determining a plurality of user demand values corresponding to the plurality of pieces of product information based at least in part on the category grading value and at least one of the plurality of attribute grading values associated with each of the plurality of pieces of product information, wherein determining the plurality of user demand values includes determining a user demand value corresponding to the piece of product information, wherein the user demand values are based at least in part on an impression log that records a number of times a piece of product information is displayed and on a click log that records a number of times a piece of product information that has been displayed has been clicked, wherein determining the user demand value corresponding to the piece of product information includes:
      determining at least a subset of the plurality of attributes that meet a condition based at least in part on a respective plurality of attribute grading values, wherein the condition is associated with a selected attribute grading value from the plurality of attribute grading values; and
      determining the user demand value corresponding to the piece of product information based at least in part on the category grading value, the determined at least the subset of the plurality of attributes, a weighting associated with category, and a weighting associated with the at least the subset of the plurality of attributes; and
   ranking the plurality of pieces of product information based at least in part on the corresponding plurality of user demand values.

14. The method of claim 1, wherein the selected attribute grading value comprises a highest attribute grading value from the plurality of attribute grading values and the condition further comprises being associated with the highest attribute grading value.

15. The method of claim 1, wherein the impression log records a number of times a piece of product information is displayed in connection with a search result for a past search.

16. The method of claim 1, wherein a number of clicks associated with a particular piece of product information that exceed a threshold click value is excluded in the determination of the user demand value.

17. The method of claim 1, wherein:
the category is assigned one of a plurality of category grading values based at least in part on:
a comparison between a plurality of category thresholds and the number of times pieces of product information is displayed, and
a comparison between the plurality of category thresholds and the number of times a piece of product information that has been displayed has been clicked, and
the plurality of attributes are respectively assigned one of a plurality of attribute grading values based at least in part on:
a comparison between a plurality of attribute thresholds and a number of times pieces of product information associated with a corresponding one of the plurality of attributes is displayed, and
a comparison between plurality of attribute thresholds the number of times a piece of product information associated with a corresponding one of the plurality of attributes that has been displayed has been clicked.

18. The method of claim 1, wherein the category describes a classification of product information, and wherein the plurality of attributes comprises one or more brands associated with the plurality of pieces of product information.

19. The method of claim 1, wherein the category grading value and at least one of the plurality of the attribute grading values are determined separately.

20. The method of claim 1, wherein the user demand value corresponding to the piece of product information is based at least in part on a summation of a first weighted value corresponding to the category and one or more second weighted values corresponding to the at least the subset of the plurality of attributes.

* * * * *